(12) United States Patent
Kuhm et al.

(10) Patent No.: US 9,856,899 B2
(45) Date of Patent: Jan. 2, 2018

(54) FASTENING ELEMENT FOR FASTENING LINING PARTS, CARRIER FOR A FASTENING ELEMENT, AND TOOL FOR REMOVING A FASTENING ELEMENT

(71) Applicant: ITW FASTENER PRODUCTS GmbH, Iserlohn (DE)

(72) Inventors: Michel Kuhm, Ingwiller (FR); Emmanuel Ouine, Bischwiller (FR)

(73) Assignee: ITW FASTENER PRODUCTS GMBH, Iserlohn (DE)

( * ) Notice: Subject to any disclaimer, the term of this patent is extended or adjusted under 35 U.S.C. 154(b) by 0 days.

(21) Appl. No.: 14/590,249

(22) Filed: Jan. 6, 2015

(65) Prior Publication Data

US 2015/0219138 A1    Aug. 6, 2015

(30) Foreign Application Priority Data

Jan. 31, 2014   (FR) .................................. 14 00267

(51) Int. Cl.

| F16B 21/06 | (2006.01) |
|---|---|
| B60R 13/02 | (2006.01) |
| F16B 21/08 | (2006.01) |
| F16B 5/06 | (2006.01) |

(52) U.S. Cl.
CPC .......... *F16B 21/06* (2013.01); *B60R 13/0206* (2013.01); *F16B 21/086* (2013.01); *F16B 5/0657* (2013.01); *Y10T 29/53* (2015.01); *Y10T 403/606* (2015.01)

(58) Field of Classification Search
CPC ...... F16B 21/06; F16B 21/086; F16B 5/0657; B60R 13/0206; Y10T 403/606; Y10T 29/53
See application file for complete search history.

(56) References Cited

U.S. PATENT DOCUMENTS

| 5,651,634 | A | * | 7/1997 | Kraus | ................... F16B 5/0628 403/331 |
|---|---|---|---|---|---|
| 6,438,804 | B1 | * | 8/2002 | Romero Magarino | ........... B60R 13/0206 24/289 |
| 7,328,489 | B2 | * | 2/2008 | Leverger | ............... F16B 5/0628 24/292 |
| 7,637,527 | B2 | * | 12/2009 | Mazanek | ................ B60R 21/04 280/728.2 |
| 7,785,030 | B2 | * | 8/2010 | Klein | .................. B60R 13/0206 24/453 |
| 7,927,050 | B2 | * | 4/2011 | Koike | ................... F16B 5/0628 411/104 |

(Continued)

FOREIGN PATENT DOCUMENTS

| DE | 19954293 | 6/2001 |
|---|---|---|
| DE | 102004057400 | 6/2006 |

(Continued)

*Primary Examiner* — Victor L MacArthur
(74) *Attorney, Agent, or Firm* — Joseph M. Butscher; The Small Patent Law Group, LLC (57) ABSTRACT

A fastening element for fastening lining parts has a fastening section for attachment of a lining part thereto, and a locking section adapted to lock with a carrier for the fastening element. The locking section includes at least one locking tab. The locking tab has a release tab provided thereon for engagement by a tool for shifting the locking lab to a release position.

11 Claims, 5 Drawing Sheets

(56) References Cited

U.S. PATENT DOCUMENTS

| | | | | |
|---|---|---|---|---|
| 8,424,170 | B2* | 4/2013 | Reznar | F16B 5/065 24/297 |
| 9,328,759 | B2* | 5/2016 | Kuhm | B60R 13/0206 |
| 2006/0000064 | A1* | 1/2006 | Leverger | F16B 5/0628 24/297 |
| 2007/0216139 | A1* | 9/2007 | Mazanek | B60R 21/04 280/728.2 |
| 2009/0133228 | A1* | 5/2009 | Werner | B60R 13/0206 24/297 |
| 2014/0003884 | A1 | 1/2014 | Diep et al. | |
| 2014/0086704 | A1* | 3/2014 | Hemingway | F16B 5/065 411/392 |
| 2014/0196259 | A1* | 7/2014 | Kuhm | B60R 13/0206 24/289 |

FOREIGN PATENT DOCUMENTS

| | | |
|---|---|---|
| DE | 20 2013 006 326 U1 | 7/2013 |
| DE | WO2015007277 | 1/2015 |
| EP | 1361117 | 11/2003 |
| JP | S63-181561 U | 11/1988 |
| WO | 2007/104530 | 9/2007 |

\* cited by examiner

FASTENING ELEMENT FOR FASTENING LINING PARTS, CARRIER FOR A FASTENING ELEMENT, AND TOOL FOR REMOVING A FASTENING ELEMENT

The invention relates to a fastening element for fastening lining pants, a carrier for a fastening element, and to a tool for removing a fastening element.

BACKGROUND OF THE INVENTION

The fastening element serves in particular to attach a lining part, for example a door lining, to a carrier which in turn is fitted to a vehicle-fixed component, such as, e.g., a vehicle body part.

Some lining parts require to be removable. To this end, use may be made of snap-in fastening elements which are released from the carrier as soon as a holding force, specified by design, is exceeded. The advantage of such fastening elements is that they allow the lining part to be removed with little effort. The drawback resides in that they provide only a comparatively small holding force which may possibly be exceeded unintentionally in operation, which then results in the lining part being inadvertently detached from the carrier.

Also already disclosed in the prior art are fastening elements which can not readily be pulled off from their carrier, but require additional steps when it is intended to release the fastening elements from the carrier.

DE 198 54 293 A1, for example, discloses a trim strip fastening for motor vehicles, having a fastening clip which can be inserted into an opening of a metal sheet or the like by means of a base part and can be located there by an expanding pin that can be driven into a central borehole of the fastening clip. The fastening clip includes a supporting plate and, spaced therefrom, a head piece around which the trim strip at least partly engages. The head pace is provided with a cut-out protruding as far as to the expanding pin, and the expanding pin has a slot-like recess disposed thereon, so that a removal of the expanding pin contrary to the insertion direction is allowed by means of an auxiliary tool.

However, use of an expanding pin is awkward and increases the number of parts to be assembled.

It is the object of the present invention to further develop a fastening element for fastening lining parts, a carrier for a fastening element, and a tool for removing a fastening element of the kind initially mentioned in an advantageous manner, in particular to the effect that a fastening element for fastening lining parts is structured more simply than was the case so far.

BRIEF DESCRIPTION OF THE INVENTION

In order to solve this object, the invention provides a fastening element for fastening lining parts has a fastening section for attachment of a lining part thereto, and a locking section adapted to lock with a carrier for the fastening element. The locking section includes at least one looking tab. The locking tab has a release tab provided thereon for engagement by a tool for shifting the looking tab to a release position. The invention is based on the basic idea of suitably actively deforming the fastening element by means of the tool when it is intended to release the fastening element from the carrier. This allows the fastening element to be configured such that it basically, i.e. without the tool being operated, reliably locks on the carrier and, in doing so, provides a high holding force. The locking connection used here between the fastening element and the carrier need not be designed to the effect that the fastening element becomes automatically released from the carrier in case of a high release force, for example by suitable slopes on the fastening element or on the carrier. In fact, the connection between the carrier and the fastening element can be made to be self-retaining, for example by means of an undercut. When it is intended to release the fastening element, it is suitably deformed by means of the tool, so that it becomes released from the carrier. This ensures that the fastening element can be released from the carrier with little force when required.

The holding force that can be attained may be comparatively high. For example, the holding force can be greater than 300 N.

The force required for the locking or insertion of the fastening element may be comparatively low and amount to, e.g., about one seventh to about one tenth of the holding force. For example, the insertion force that needs to be applied for the fastening element to be locked may amount to less than about 40 N.

The release force, i.e. the force that needs to be applied in order that the mounted fastening element is released, may be lower than the insertion force, for example, and may more particularly amount to only about one third to about half of the insertion force. The release force may amount to about 20 N, for example.

The fastening element may be an injection molded part. This results in low manufacturing costs.

More particularly, the fastening element may be formed in one piece. This obviates assembly costs for assembling the fastening element from a plurality of individual parts.

The fastening element may, for example, be made of a thermoplastic material such as polypropylene or polyamide.

The carrier may be a carrier as will be described further below, which can be fastened to a vehicle body part, for example.

The fastening element may more particularly be connected to a lining part by means of a separate intermediate piece.

In addition, provision may be made that the release tab is arranged on the end of the locking tab facing the fastening section. This results in the advantage that a tool for removal of the fastening element can be introduced and applied close to the carrier for the fastening element and therefore so as to be well accessible from outside.

Furthermore, provision may be made that the locking tab extends toward the fastening section, starting from an end of the locking section facing away from the fastening section. This results in the advantage that the locking tab is formed so as to be comparatively long and therefore flexible. This influences and advantageously increases the holding force. At the same time, the flexibility has the effect of allowing the fastening element to be locked and released applying low forces.

The fastening section may have two locking tabs arranged thereon which are symmetrically opposite each other. This allows a uniform distribution of force and also a uniform application of the holding force by the fastening element. In addition, this also facilitates the locking and release of the fastening element.

The locking tabs may be structured substantially identically.

Provision may further be made that at least one pretensioning element is provided which urges the fastening element away from the carrier when the fastening element has locked in place there. A pretensioning element of this type allows the fastening element to be braced in the carrier and vibrations to be thereby reduced or even entirely avoided.

Any generation of noise, which is perceived to be unpleasant can be suppressed in this way.

Provision may be made for a plurality of pretensioning elements, in particular two pretensioning elements. The pretensioning elements may be arranged symmetrically.

More particularly, provision may be made that the pretensioning elements are designed so as to be wing-like, cushion-like or web-like.

The present invention further relates to a carrier for a fastening element. According thereto, a carrier for a fastening element includes a guide for a tool which is adapted to engage the release tab of the fastening element such that the locking tab is shifted to a release position. This results in the advantage that the tool for releasing the fastening element is automatically correctly positioned and guided, so that the fastening element can be released simply and reliably. This is an advantage in particular because the tool has to be applied "blindly" in most cases since the fastening element is usually arranged so as not to be visible. In addition, the guide ensures that the insertion force acts in the "right" direction, that is, in the direction necessary for releasing the fastening element. For this reason, only a small force is required for release, more particularly only a release force of about 20 N.

Furthermore, an insertion slope for the tool may be advantageously provided. This facilitates insertion and correct application of the tool.

Provision may further be made that the guide is in the form of a rectangular guide channel. This automatically results in guide faces which are opposite each other in pairs and allow the tool to be guided with little effort. In addition, a rectangular guide channel is simple to form.

Moreover, the present invention relates to a fool for removing a fastening element. According thereto, a tool for removing a fastening element is made from a flat material and has two release slopes opposite each other. This results in a small height of the tool, which leads to an overall flat design of the assembly according to the invention. The release slopes are advantageously arranged here such that when the tool is inserted, they will automatically move into engagement with the release tabs of the fastening element and press them together such that the fastening element is released from its locked condition. The fastening element can then be simply removed from the carrying member.

The base body of the tool may be elongated and have a rectangular cross-section. Such a cross-section may be obtained with little effort either by punching the tool from sheet metal or by injection molding of the tool. Here, the cross-section of the tool is adjusted to the guide channel of the carrying member for the fastening element such that the tool can be readily inserted but, at the same time, is reliably guided such that the release slopes engage the release tabs.

BRIEF DESCRIPTION OF THE DRAWINGS

Further features and advantages of the invention will be apparent from the description below and from the accompanying drawings, to which reference is made and in which.

DETAILED DESCRIPTION OF THE INVENTION

FIGS. 1 to 5 show a fastening element 10 as an exemplary embodiment of the invention.

The fastening element 10 includes a fastening section 12 and a locking section 14. The fastening section 12 is provided for connection with a component to be fastened. To this end, a receiving element may be provided, which may be formed in one piece with the component or in the form of a separate part fitted to the component. The locking section 14 is provided for locking with a carrier to be discussed further below, so that the component to be fastened is then attached to the carrier. The carrier may also be configured as a separate part or may be integrated in some other part.

The fastening section 12 includes a cylindrical section 16 and a substantially rectangular platform 18 which is integrally formed with the cylindrical section 16. In cooperation with a suitably designed receiving element the rectangular basic shape of the platform ensures that the fastening element 10 can be inserted into the receiving element only in the correct orientation. To this end, the dimensions of the receiving element are adjusted to the smaller width of the platform; when rotated through 90 degrees, that is, by its larger width, the platform can not be inserted into the receiving element.

Figure 1:
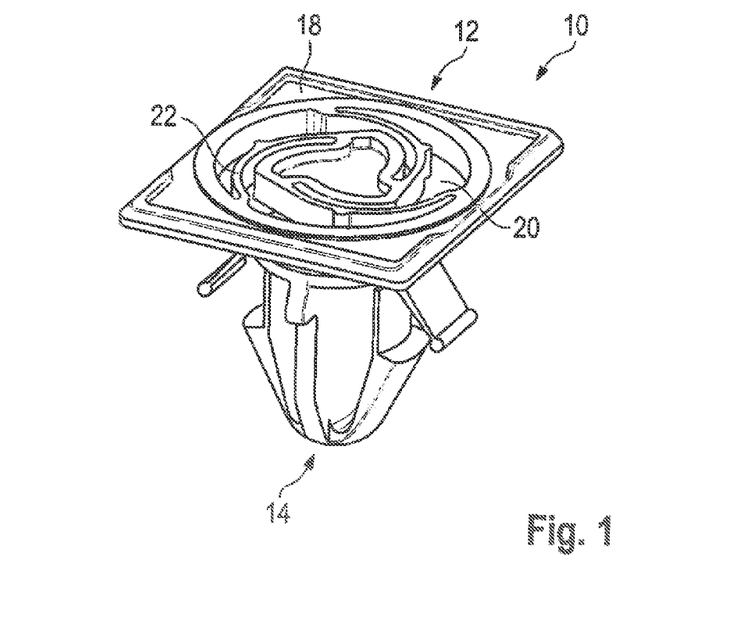
FIG. 1 shows a perspective view of a fastening element according to an exemplary embodiment of the invention.
Figure 2:
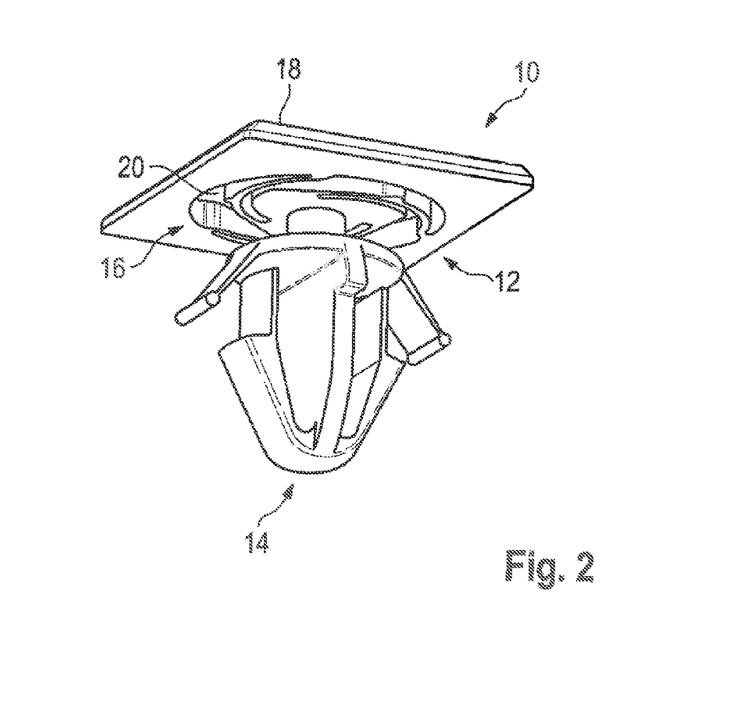
FIG. 2 shows a further perspective view of the fastening element of FIG. 1.
Figure 3:
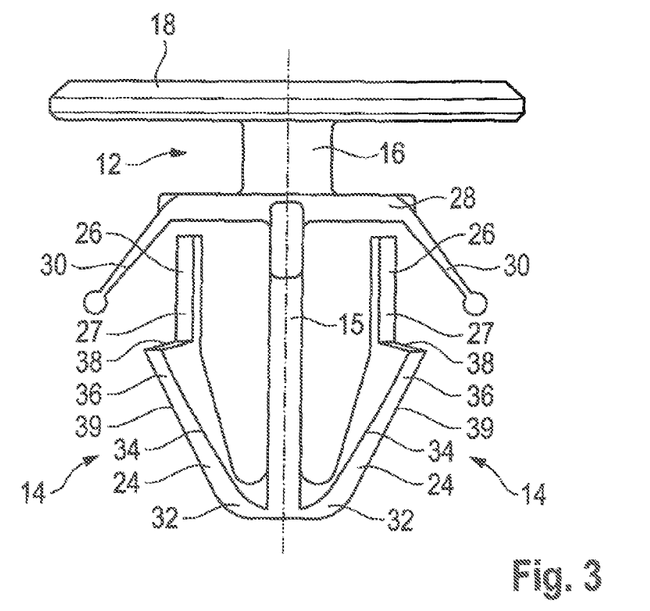
FIG. 3 shows a side view of the fastening element of FIGS. 1 and 2.

As is apparent from FIG. 2, the platform 18 has an opening 20 in its center. The end of the cylindrical section 16 facing the platform 18 protrudes into the opening 20 and is connected with the platform 18 via a plurality of spring bars 22.

Figure 5:
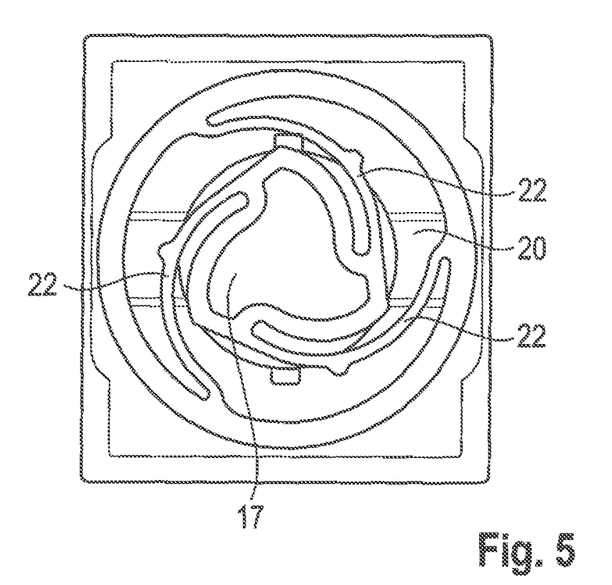
FIG. 5 shows a top view of the fastening element of FIGS. 1 and 2.

The spring bars 22 have a spiral shape, as is well visible in FIG. 5.

The spring bars 22 are hinged to a substantially triangular end section 17 of the cylindrical section 16. The spring bars here extend along the outer surfaces of the end section over a large part of their length, so that in the case of large deflections, they are held in contact and supported there. This prevents an excessive deflection of the end section and, hence, an excessive deformation of and load on the spring bars.

The locking section 14 includes a middle web 15 and a pair of locking tabs 24 which are symmetrically opposite each other. The structure of the two locking tabs 24 is identical.

The locking tabs 24 extend toward the fastening section 12, starting from an end of the looking section 14 facing away from the fastening section 12.

The locking tabs 24 each have a release tab 26 provided thereon which is arranged on the end of the looking tab 24 facing the fastening section 12.

Opposite the free ends of the release tabs 26, a flange 28 is provided on the end of the cylindrical section 16 facing away from the platform 18. The flange 28 has a pair of pretensioning elements 30 arranged thereon, again symmetrically with each other.

The pretensioning elements 30 project from the flange 28 at an acute angle toward the looking section 14 and, in this exemplary embodiment, have a wing-like configuration.

The tip of the middle web 15 of the locking section 14 facing away from the platform 18 and the side of the platform 18 facing the locking section 14 have a distance of 21.4 mm from each other.

The platform 18 has a thickness of 2.2 mm. As is apparent from the top view of the platform 18 in FIG. 5, the platform 18 has a rectangular basic shape with a length of 28.4 mm and a width of 25.6 mm.

The cylindrical section 16 has a diameter of 4.9 mm.

The locking tabs 24 each have an elastically deformable spring section 32 by which they are resiliently linked to the middle web 15. The spring section 32 is adjoined by a thickening reinforcement section 34 which terminates in the locking tooth 36.

The reinforcement section 34 is then adjoined by the release tab 26. The release tab 26 is arranged on the side of the reinforcement section 34 facing the middle web 15 and, in the non-loaded condition of the fastening element 10, extends parallel to the middle web 15.

The release tabs 28 each have a length of 5.7 mm. The two inner sides of the release tabs 26 facing the middle web 15 have a distance of 9.2 mm from each other.

Rounded tool engagement surfaces 27 are formed on the side of the release tab 26 facing away from the middle web 15. The tool engagement surfaces 27 define a circle having a diameter of 11.8 mm.

The looking tooth 36 has a tooth face 38 and a tooth back 39. The tips of the looking teeth 36 have a distance of 15.1 mm from each other.

The tooth back 39 is formed by the side of the reinforcement section 34 facing away from the middle web 15.

The transition between the spring section 32 and the middle web 15 is made with a radius of 0.95 mm on the inside, that is, in the region where the spring section 32 transitions into the reinforcement section 34.

The pretensioning elements 30 project from the flange 28 toward the locking section 14 at an angle of 54 degrees. The tips of the pretensioning elements 30 have a distance of 10.5 mm from the side of the platform 18 facing the locking section 14. The two tips of the pretensioning elements 30 have a distance of 21.8 mm from each other.

Figure 4:
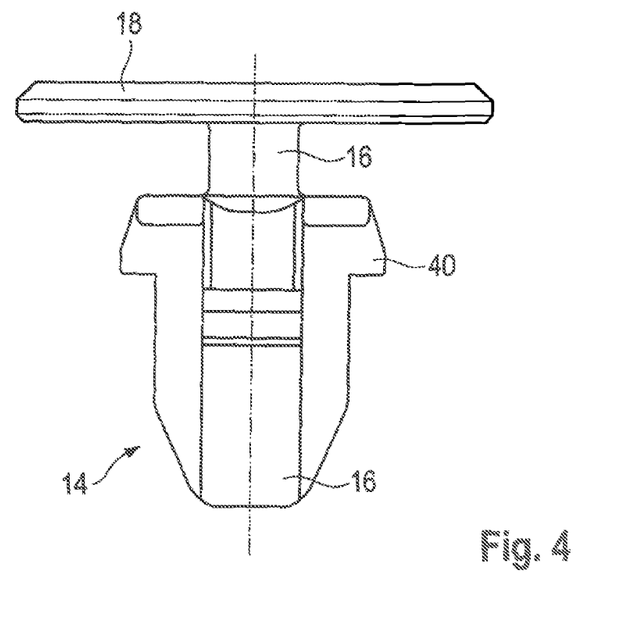
FIG. 4 shows a further side view of the fastening element of FIGS. 1 and 2.

It is apparent from the side view according to FIG. 4 that the middle web 15 has an arrow-shaped design. The base body of the middle web 15 has a width of 11.8 mm.

In the region of the flange 28, the middle web includes a shoulder 40 which has a height of 4.5 mm. The shoulder 40 has a diameter of 16 mm.

Figure 6:
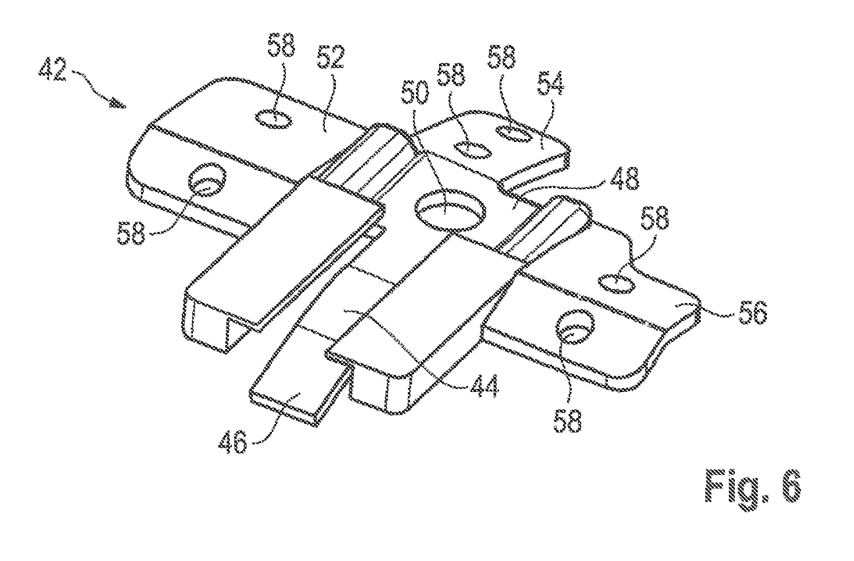
FIG. 6 shows a perspective view of a carrier according to an embodiment of the invention, the carrier being provided for cooperation with the fastening element of FIGS. 1 to 5.

FIG. 6 shows a perspective top view of an exemplary embodiment, according to the invention, of a carrier 42 for the fastening element 10 as is shown in FIGS. 1 to 6.

The carrier 42 includes a guide 44 which is in the form of a rectangular guide channel 44.

The guide channel 44 has an insertion slope 46 on its input side.

On the output side of the guide channel 44, the carrier 42 includes a middle section 48 auf. Provided in the middle section 48 is a central, circular opening 50.

Furthermore, the middle section 48 has three lateral sections 52, 54, 56 formed integrally therewith, which have fastening holes 58.

The carrier 42 is formed in one piece here.

The carrier 42 may, for example, be a metal component or a plastic component or a composite fiber material component.

Figure 7:
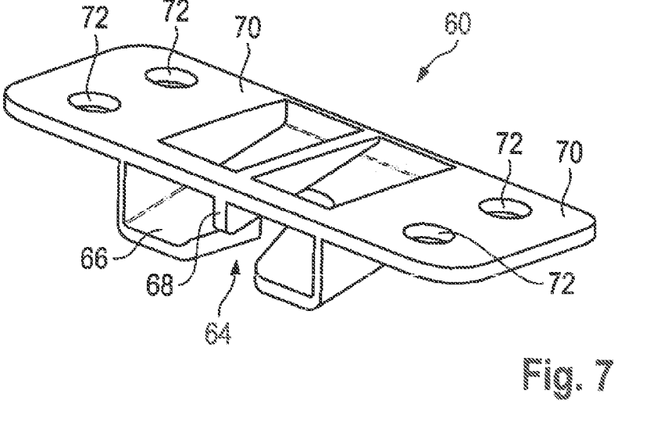
FIG. 7 shows a perspective top view of a receiving element for the fastening element according to FIGS. 1 to 5.

FIG. 7 shows a perspective top view of a receiving element 60 for the fastening element 10 according to FIGS. 1 to 5.

The receiving element 60 has a middle section 62 including an insertion channel 64 having an insertion slope 66 and a latching rib 68.

The middle section 62 has two lateral wings 70 formed thereon which each have a pair of fastening holes 72.

Figure 8:
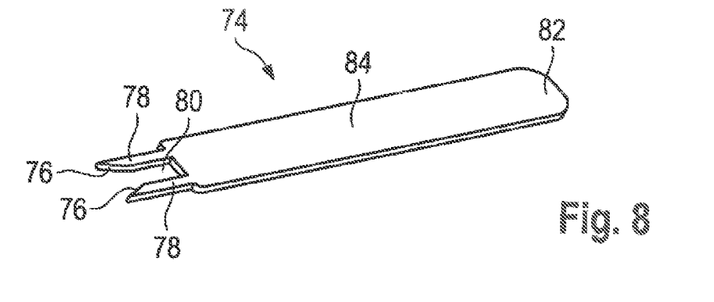
FIG. 8 shows a perspective view of a tool according to an embodiment of the invention, the fool being provided for cooperation with a fastening element according to the invention.
Figure 9:
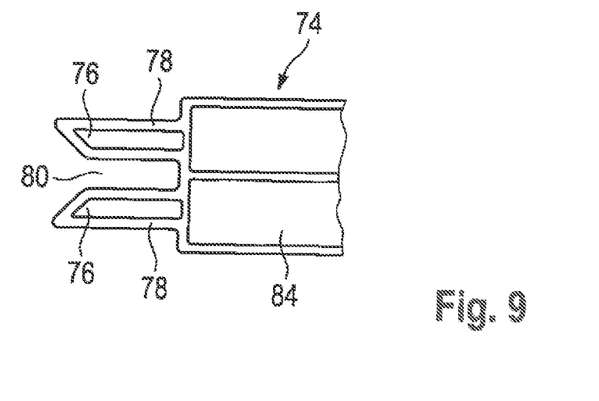
FIG. 9 shows the release slopes of the tool of FIG. 8 in an enlarged top view.
Figure 10:
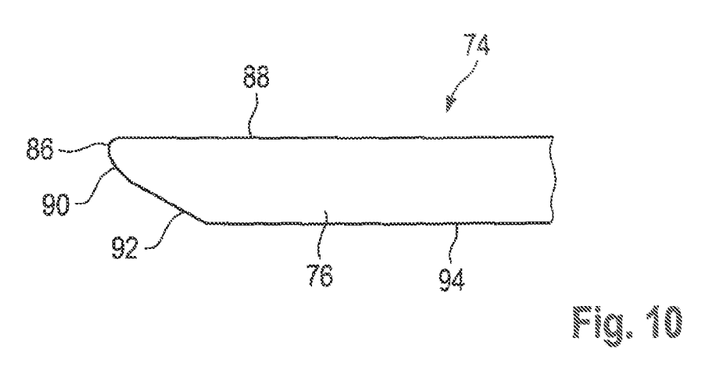
FIG. 10 shows the release slopes of the tool of FIG. 8 in a still further enlarged side view.

FIGS. 8 to 10 show a tool 74 for removing a fastening element 10.

The tool 74 is made from a flat material and has two release slopes 76 opposite each other.

The release slopes 76 here are each formed on a respective end of two parallel pins 78 which are integrally formed with an end of the tool 74.

The release slopes 76 and the internal surfaces of the pins 78 define an intermediate space 80 which narrows toward the tool 74.

This intermediate space 80 has its largest width at the level of the tips of the release slopes 76 and reduces its width along the release slopes 76 toward the tool 74.

The tool 74 includes a handle portion 82 at its end facing away from the release slopes 76.

The middle portion 84 of the tool 74 has information or labels attached thereto, printed thereon or stamped therein, for example.

The release slopes 76 are arranged symmetrically and have an opening angle of 90 degrees.

The release slopes 76 are integrally formed with the end of the portion 84, which here has a width of 24 mm.

As can be further seen from the detailed side view according to FIG. 10 of the release slopes 76 of the tool 74, the release slopes 76, viewed in the side view, form a rounded tip 86.

In this exemplary embodiment, the rounded tip 86 has a radius of 0.5 mm here.

The rounded tip 86 is arranged here at the level of one of the flat sides, in this case the upper side 88.

In a side view, starting from the tip 86 a first lateral slope 90 runs at an angle of 55 degrees, which is then adjoined by a second lateral slope 92 running at an angle of 30 degrees toward the second flat side, in this case the underside 94.

The function of the fastening element 10 can be described as follows:

The fastening element 10 is locked in the central circular opening 50 of the carrier 42 by means of the locking section 14.

The insertion force therefor amounts to less than 40 N here, for example.

The design of the locking tabs 24 allows holding forces of more than 300 N.

The fastening section 12 along with the platform 18 is inserted into the receiving element 60.

To this end, the platform 18 is pushed into the insertion channel 64, which is facilitated by the insertion slope 66. The latching rib 68 prevents the platform 18 from slipping out. The receiving element 60 is snap-fitted with a lining part by means of the fastening holes 72, for example.

Any lateral offset between the carrier 42 and the receiving element 60 for the lining part can be compensated for by means of the spring bars 22.

Figure 11:
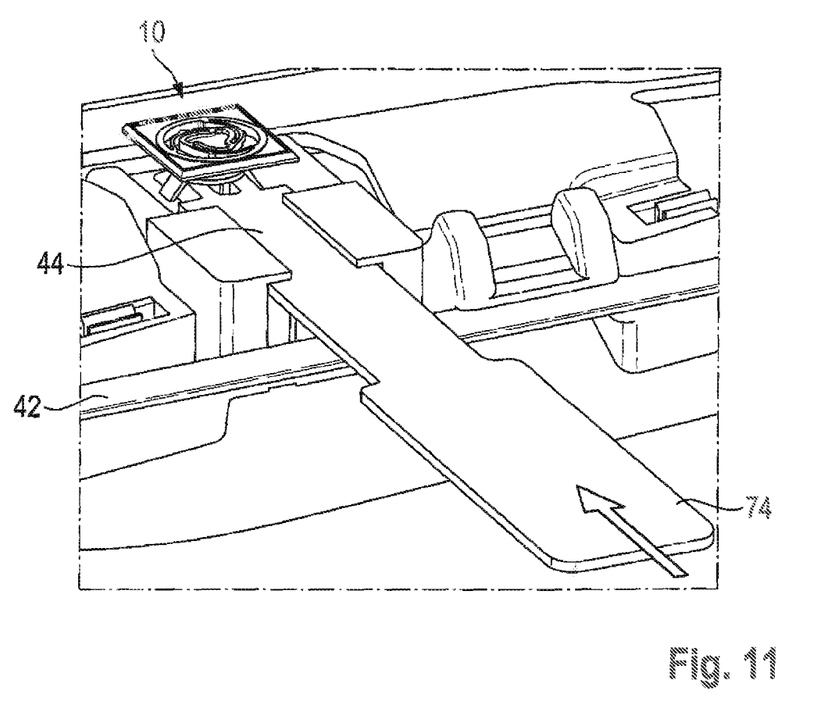
FIG. 11 shows a perspective view of the fastening element mounted in the carrier with a tool engaging it.

FIG. 11 shows a perspective top view of the fastening element 10 as mounted in the carrier 42, but without the receiving element 60.

To release the fastening element 10, the tool 74 is pushed, with the release slopes 76 first, into the rectangular guide channel 44, which is facilitated by the insertion slope 46 on the input side. A certain flexibility of the tool also facilitates its insertion.

The release slopes 76 are moved toward the release tabs 26 through the guide channel 44. By applying the release slopes 76, the release tabs 26 are pushed into the intermediate space 80 and thus toward the middle web 15 of the fastening element 10.

This causes the locking tabs 24 to be released from their locked condition in the opening 50, and the fastening element 10 can be removed.

According to this exemplary embodiment, releasing the locking mechanism only requires a release force of less than 20 N to be applied.

The invention claimed is:

1. A fastening element for fastening lining parts, comprising a fastening section for attachment of a lining part thereto, a locking section adapted to lock with a carrier for said fastening element, said looking section including at least one locking tab, said at least one looking tab having a release tab provided thereon for engagement by a tool for shifting said at least one locking tab to a release position, and a flange coupled to said fastening section by a cylindrical section, wherein said release tab is directly underneath at least a portion of said flange, wherein a rounded tool engagement surface is formed on a side of said release tab, wherein said rounded tool engagement surface defines a portion of a circle.

2. The fastening element of claim 1 wherein said release tab is arranged on an end of said at least one locking tab facing said fastening section.

3. The fastening element of claim 1 wherein said at least one locking tab extends toward said fastening section, starting from an end of said looking section facing away from said fastening section.

4. The fastening element of claim 1 wherein said fastening section has two locking tabs arranged thereon which are symmetrically opposite each other.

5. The fastening element of claim 1 wherein at least one pretensioning element is provided which urges said fastening element away from said carrier when said fastening element has locked in place.

6. An assembly comprising: a carrier and said fastening element of claim 1, wherein said locking section is configured to lock with said carrier said carrier having a guide for said tool which is adapted to engage said release tab, said guide being adapted for guiding said tool such that said at least one locking tab is shifted to the release position.

7. The assembly of claim 6 wherein an insertion slope for said tool is provided.

8. The assembly of claim 6 wherein said guide is in the form of a rectangular guide channel.

9. The fastening element of claim 1, and a tool for removing said fastening element from a carrier, said release tab for engagement by said tool, said carrier having a guide for said tool which is adapted to engage said release tab, said guide being adapted for guiding said tool such that said at least one locking tab is shifted to the release position, said tool being made from a flat material, said tool having two release slopes opposite each other.

10. The fastening element of claim 1, wherein said rounded tool engagement surface is outwardly curved away from a central longitudinal axis of the fastening element.

11. The fastening element of claim 1, wherein said locking section further comprises a middle web connected to said at least one locking tab, wherein an interior surface of said release tab faces a side of said middle web, and wherein said rounded tool engagement surface faces away from said middle web.

* * * * *